United States Patent
Yearous et al.

(10) Patent No.: US 10,967,550 B2
(45) Date of Patent: Apr. 6, 2021

(54) HIGH YIELD STRENGTH, LOW THERMAL IMPEDANCE COMPONENT AND MANUFACTURING METHOD

(71) Applicant: Plantronics, Inc., Santa Cruz, CA (US)

(72) Inventors: Bradley Yearous, Aptos, CA (US); Barry J Lee, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 881 days.

(21) Appl. No.: 15/347,558

(22) Filed: Nov. 9, 2016

(65) Prior Publication Data

US 2018/0126615 A1 May 10, 2018

(51) Int. Cl.
| | |
|---|---|
| *B29C 45/73* | (2006.01) |
| *B33Y 10/00* | (2015.01) |
| *B33Y 40/00* | (2020.01) |
| *B33Y 80/00* | (2015.01) |
| *B23K 26/342* | (2014.01) |
| *B23K 26/00* | (2014.01) |
| *B23P 15/00* | (2006.01) |
| *B23K 103/04* | (2006.01) |

(Continued)

(52) U.S. Cl.
CPC .......... *B29C 45/73* (2013.01); *B23K 26/0006* (2013.01); *B23K 26/342* (2015.10); *B23P 15/007* (2013.01); *B33Y 10/00* (2014.12); *B33Y 40/00* (2014.12); *B33Y 80/00* (2014.12); *B23K 2101/12* (2018.08); *B23K 2103/04* (2018.08); *B23K 2103/12* (2018.08); *B23K 2103/16* (2018.08); *B29K 2995/0012* (2013.01); *B29K 2995/0013* (2013.01)

(58) Field of Classification Search
CPC ......... B29C 45/73; B33Y 10/00; B33Y 40/00; B33Y 80/00; B23K 26/342; B23K 26/0006; B23P 15/007
See application file for complete search history.

(56) References Cited

U.S. PATENT DOCUMENTS

| | | | |
|---|---|---|---|
| 6,112,804 A | * | 9/2000 | Sachs ...................... B22C 9/065 164/348 |
| 9,089,998 B2 | | 7/2015 | Altonen et al. |

(Continued)

OTHER PUBLICATIONS

Kazmer, "Injection Mold Design Engineering," 2007, pp. 1-15, 199-232, 299-341, Chapters 1, 9, and 12, Hanser Gardner Publications, Cincinnati, OH, US.

(Continued)

*Primary Examiner* — Joseph S Del Sole
*Assistant Examiner* — John Robitaille
(74) *Attorney, Agent, or Firm* — Haynes Beffel & Wolfeld LLP; Mark A. Haynes

(57) ABSTRACT

A machine component is formed of a coalesced metal body of multiple zones of material having at least one high hardness surface, along with high yield strength and good thermal conductivity. The coalesced metal body can have a zone of steel and a zone of copper, and have a transition zone in which the zones of steel and copper coalesce. The coalesced metal body has a machined surface on the zone of steel on a first side of the coalesced metal body. The zone of copper has a proximal boundary disposed proximal to, and separated by, the zone of steel, from the machined surface. Also the zone of copper has a distal boundary distal to the machined surface and proximal to a second surface of the coalesced metal body.

19 Claims, 6 Drawing Sheets

(51) Int. Cl.
    *B23K 103/12*     (2006.01)
    *B23K 103/16*     (2006.01)
    *B23K 101/12*     (2006.01)

(56) References Cited

U.S. PATENT DOCUMENTS

| | | |
|---|---|---|
| 2003/0217994 A1 | 11/2003 | Ding |
| 2014/0004222 A1* | 1/2014 | Sorensen ............. B22F 3/1055 425/547 |

OTHER PUBLICATIONS

D. Mori, Ed., "Additive Manufacturing in Milling Quality," 2014 (6 pages), found at URL <http://en.dmgmori.com/blob/176078/01e15b6a1ada509cb34fa169fafaed17/pl0uk14-lasertec-additive-manufacturing-pdf-data.pdf>.

* cited by examiner

HIGH YIELD STRENGTH, LOW THERMAL IMPEDANCE COMPONENT AND MANUFACTURING METHOD

BACKGROUND

Field of the Technology

The present disclosure relates to high yield strength, low thermal impedance components, such as components of injection molding machines, and manufacturing methods for the same.

Description of Related Art

In many machines, high yield strength and high hardness components are subjected to heating and cooling cycles, or can require precise thermal control. The amount of time required to heat and cool these components can contribute significantly to the cost of operating these machines.

The mold cavity and supporting structures in injection molding machines are typically high yield strength and high hardness components of this type. In an injection molding machine, a mold cavity is formed by machined components referred to as a cavity insert and a core insert, which are mounted on supporting plates known as the "A" and "B" plates. In each molding cycle, the inserts are forced together by closing the tool, and molten plastic is injected into the mold cavity at high temperature and pressure. The cavity and core inserts, along with the injected plastic are then cooled until the plastic is ready for ejection. The core and cavity inserts are separated after this cooling cycle, and the molded piece is ejected.

The components of an injection molding machine, including the core and cavity inserts, and supporting "A" and "B" plates, are relatively complex in order to support the injection functions, the cooling functions and the ejection functions of the process. Also, the thicknesses of the walls on the components vary in thickness with variations in thickness and configuration of the plastic part. These variations can cause differential cooling, and in turn differential shrinkage of the plastic material as it approaches solidification. Thus, uniformity of the cooling and heating of the material can be extremely limited due to the variations in the structure of the components relative to the mold cavity.

Also, these components of an injection molding machine can be subjected to enormous forces and high numbers of cycles over their useful life. As a result, for some applications, these components are manufactured using high yield strength and high hardness steel. Steels of this type have relatively low thermal conductivity. Because of the low thermal conductivity, the times required for heating and cooling are relatively long, increasing the duration of the molding cycles for the machine. As mentioned above, the duration of the molding cycles can be a significant element of the cost of operating the machine.

It is desirable therefore, to provide improved technology for reducing the thermal impedance of high yield strength and high hardness components, and particularly of components having complex shapes such as used in injection molding machines.

SUMMARY

A machine component comprising a coalesced metal body having at least one hard surface, along with high yield strength and good thermal conductivity is described. The coalesced metal body has a 3D patterned zone of steel and a 3D patterned zone of copper, and has a transition zone in which the zones of steel and copper coalesce. The coalesced metal body can have a machined surface on the zone of steel on a first side, which can be subject of extremes of heating and cooling, and of extremes of pressure during utilization of the component. The zone of copper has a proximal boundary disposed proximal to, and separated by the zone of steel, from the machined surface. In some embodiments, this can be characterized as a skin of steel on the machined surface, over the zone of copper. Also, the zone of copper has a distal boundary distal to the machined surface and proximal to a second surface of the coalesced metal body. The second surface can be arranged for coupling to a heat sink or other heat transfer feature, for removing heat from, or supplying heat to, the component during heating and cooling cycles.

As described herein, the coalesced metal body can be manufactured using laser deposition welding to form a blank having a 3D patterned zone of steel and a 3D patterned zone of copper, and then milling the blank. Using laser deposition welding results in the transition region between the 3D patterned zones being a welded combination of steel and copper. Also, the 3D patterned zone of steel in the 3D patterned zone of copper can have complex shapes.

The coalesced material in the transition region provides a low thermal impedance and mechanically strong bond between the zone of steel and the zone of copper. As a result, the coalesced metal body has high yield strength provided by the zone of the steel. Also, the coalesced metal body can have a machined surface of high hardness formed completely in the zone of steel without exposing the zone of copper on the machined surface. The zone of copper provides a low thermal impedance path for conduction of heat to and from the machined surface, and for a cooling cycle toward a heatsink which can be placed in contact with, or otherwise in thermal communication with, a second surface of the coalesced metal body. In some embodiments, the zone of copper is exposed at portions of the second surface to improve thermal contact with adjacent components.

The machine component can include a channel disposed completely in the zone of steel so that no sub-zones of the zone of copper are exposed within the channel. The machine component can include a channel disposed completely in the zone of copper so that no sub-zones of the zone of steel are exposed within the channel. The channel can extend into or through the coalesced metal body. For example, the channel can be configured to receive a flow of liquid coolant. Also, the channel can be configured for receiving a movable pin, or a guide pin. In some embodiments, the sub-zone of the zone of steel including the channel can be surrounded by sub-zones of the zone of copper, by which the durability of the zone of steel is presented in the channel. In embodiments in which the channel comprises a coolant channel, the thermal conductivity of the zone of copper reduces thermal impedance for flow of heat to or from the channel. Also, for a coolant channel, or other channel that is exposed to environmental reactants, it can be desirable that the channel reside entirely in one of the zone of steel or zone of copper.

As described herein, the machine component can be a cavity insert or a core insert for an injection molding machine, in which the machined surface in the zone of steel provides a surface of the mold cavity. In some embodiments, surfaces on the cavity and core inserts define a parting line in the molding machine, and the surfaces at the parting line on one or both of the cavity and core inserts are disposed completely in the zone of steel. Channels in the coalesced metal body in this type of component can include ejector pin guide channels and guide pin channels which are disposed completely within the zone of steel. The second surface of the coalesced metal body for a cavity insert or for a core insert is configured to be received by the supporting plates.

Also as described herein, the machine component can be a support plate, such as the "A" plate or the "B" plate of an injection molding machine, which is designed to receive a cavity insert or a core insert. In this type of component, the machined surface can comprise a recess configured to receive a cavity insert or core insert, and a channel or channels in the coalesced metal body can comprise channels for coolant. Also, the zone of copper can be exposed at a surface in the recess, to provide good thermal contact to a corresponding exposed sub-zone of a zone of copper on the back surface of the cavity insert or the core insert.

An injection molding machine is described which includes a plurality of components like those discussed above.

A method for manufacturing the machine component is described, which is suitable for use in manufacturing the components discussed above.

Other aspects and advantages of the present disclosure can be seen on review of the drawings, the detailed description and the claims, which follow.

DETAILED DESCRIPTION

A detailed description of embodiments is provided with reference to the FIGS. 1-8.

Figure 1:
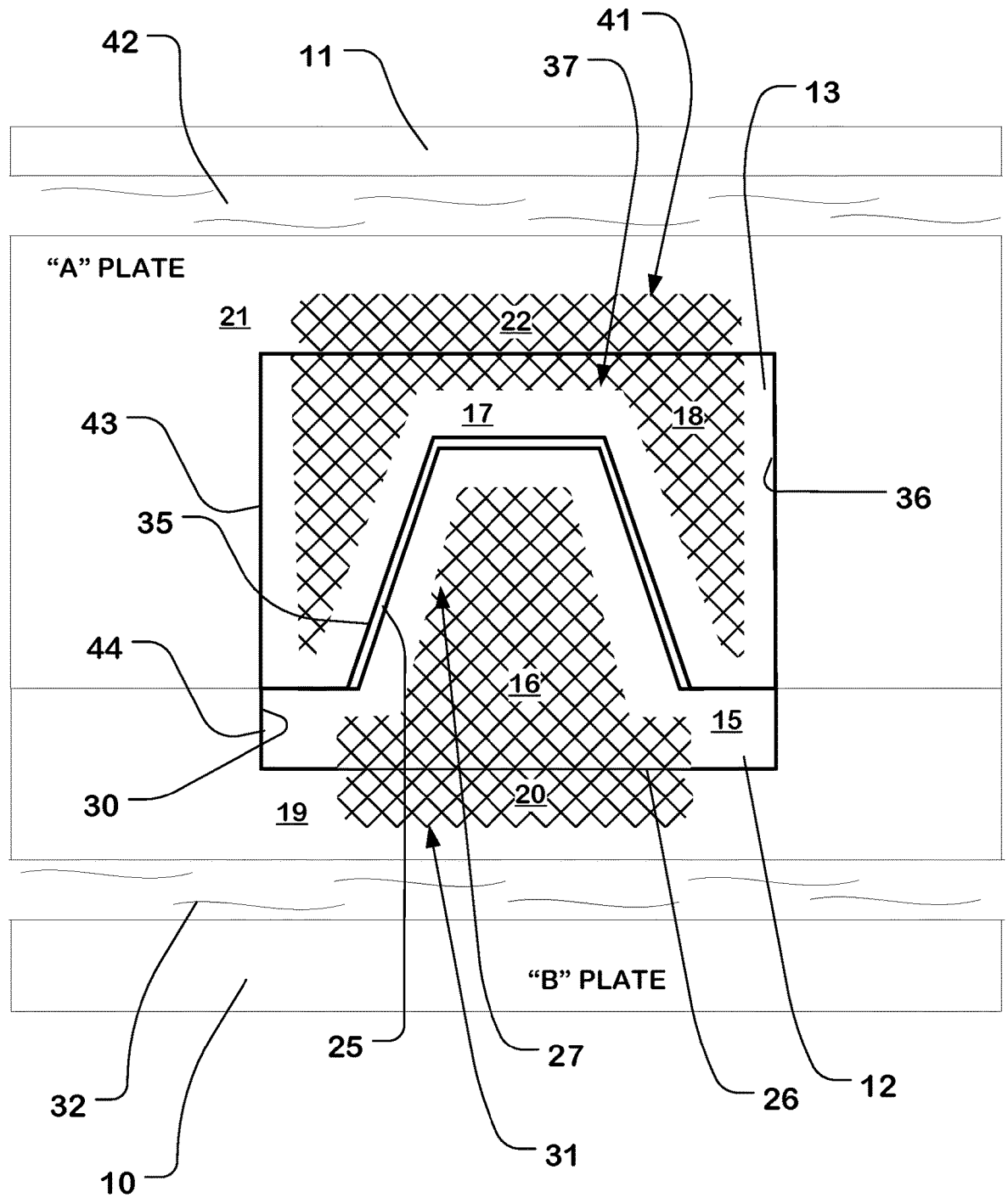
FIG. 1 is a simplified cross-section of a set of machine components for an injection molding machine, including components that comprise coalesced metal bodies as described herein.

FIG. 1 is a simplified diagram of four components of an injection molding machine, including a core insert 12, a cavity insert 13, an "A" plate 11 and a "B" plate 10. In this example, the "A" plate 11 includes a coolant channel 42. Likewise the "B" plate 10 includes a coolant channel 32. In this example, each of the four components is an example of a component of a machine that comprises a coalesced metal body having a zone of steel and a zone of copper, with a transition zone in which the zone of steel and the zone of copper coalesce. Although embodiments described herein are directed to injection molding machines, components configured as described herein can be used in a wide variety of machines which can benefit from hard surface, high yield strength and low thermal impedance components.

The zone of steel is preferably comprised of a class of carbon and alloy steels known as tool steel, members of which are typified by high hardness and high yield strength. Carbon steel varieties that are suitable for use have carbon contents in the range of 0.5% and 1.5%, for example, along with alloying elements like tungsten, chromium, vanadium and molybdenum. For embodiments applied to injection molding, and other environments, the machined surface within the zone of steel described herein has a hardness on the Rockwell scale of at least R 45. In some embodiments, the zone of steel may include more than one variety of steel in various sub-zones. For example, a sub-zone of the zone of steel in some embodiments that is disposed along a surface of the coalesced metal body can be chosen for high hardness, while a sub-zone in the zone of steel in other parts of the coalesced metal body can be chosen for other characteristics, such as tolerance to yield stress, compressive stress and tensile stress.

The zone of copper, for the purposes of the present disclosure, can consist essentially of pure copper, where pure copper is defined as at least 99% copper by weight. In other embodiments, the zone of copper can comprise alloys that are primarily copper including, for example, Beryllium Copper, Aluminum-Bronze, Naval Brass, Yellow Brass, Red Brass, Admiralty Brass, Aluminum Brass, Manganese Bronze, Silicon Bronze, and Copper Nickel Alloys. In some embodiments, the zone of copper may include more than one variety of copper, including pure copper, copper with silicon additives and copper alloyed with aluminum, for example, in various sub-zones.

Various combinations of materials for the zone of steel and the zone of copper can be selected based on environmental conditions in which the machine is deployed, including for example the type of coolants that contact the coalesced body.

For the purposes of the present description, the zone of steel can comprise one continuous zone having sub-zones combined into a complex 3D pattern, and in some examples can comprise one or more sub-zones that are discontinuous and surrounded completely by the zone of copper. The term "zone of steel" is intended to cover both types of configurations. Likewise, the zone of copper can comprise one continuous zone having sub-zones combined into a complex 3D pattern, and in some examples can comprise one or more sub-zones that are discontinuous and surrounded completely by the zone of steel. The term "zone of copper" is intended to cover both types of configurations.

Referring to the core insert 12, the zone of steel 15 has a 3D pattern represented by the unhatched portions of the component. The zone of copper 16 has a 3D pattern represented by the hatched portions of the component. A transition region 27 extends over the entire interface in preferred embodiments, between the zone of copper 16 and the zone of steel 15. The core insert 12 has a machined surface 25 which provides a surface of the mold cavity, and defines a parting line between the core insert and the cavity insert. The machined surface 25 is entirely disposed within the zone of steel, without exposing the zone of copper. The zone of copper 16 has a proximal boundary disposed proximal to, and separated by, the zone of steel 15 from the machined surface 25. The zone of copper 16 has a distal boundary distal to the machined surface 25 and proximal to a second surface 26 of the coalesced metal body. In this example, the second surface 26 of the coalesced metal body forming the core insert 12 includes a portion that exposes the zone of copper, providing for thermal contact to the underlying "B" plate 10. Also, the core insert 12 has a side surface 30 arranged for fitting within a recess on the underlying support plate, which can be disposed entirely within the zone of steel for structural strength and hardness.

The "B" plate 10 is a coalesced metal body having a zone of steel 19 and a zone of copper 20. The zone of steel 19 has a 3D pattern represented by the unhatched portions of the component. The zone of copper 20 has a 3D pattern represented by the hatched portions of the component. A transition region 31 extends over the entire interface in preferred embodiments, between the zone of copper 20 and the zone of steel 19. The "B" plate 11 has a machined surface 44 configured to receive the core insert 12, fitting closely with the second surface 26 of the cavity insert and with the side surface 30 of the cavity insert. The machined surface 44 includes portions within the zone of steel 19, and portions within the zone of copper 20 which are configured to provide thermal contact to the exposed copper on the second surface of the core insert. The "B" plate 10 has a channel 32 disposed entirely within the zone of steel 19, configured to receive a liquid coolant, and to act as a heatsink for transfer of heat to and from the mold cavity through the core insert 12. Such a channel 32 can be configured to receive a liquid coolant, by providing threaded inserts for connection to external piping, and otherwise as known in the technology field.

Likewise referring to the cavity insert 13, the zone of steel 17 has a 3D pattern represented by the unhatched portions of the component. The zone of copper 18 has a 3D pattern represented by the hatched portions of the component. A transition region 37 extends over the entire interface in preferred embodiments, between the zone of copper 18 and the zone of steel 17. The cavity insert 13 has a machined surface 35 which provides a surface of the mold cavity and defines a parting line between the core insert and the cavity insert. The machined surface 35 is entirely disposed within the zone of steel. The zone of copper 18 has a proximal boundary disposed proximal to, and separated by, the zone of steel 17, from the machined surface 35. The zone of copper 18 has a distal boundary distal to the machined surface 35 and proximal to a second surface 36 of the coalesced metal body. In this example, the second surface 36 of the coalesced metal body forming the cavity insert 13 includes a portion that exposes the zone of copper, providing for thermal contact to the receiving "A" plate.

The "A" plate 11 is a coalesced metal body having a zone of steel 21 and a zone of copper 22. The zone of steel 21 has a 3D pattern represented by the unhatched portions of the component. The zone of copper 22 has a 3D pattern represented by the hatched portions of the component. A transition region 41 extends over the entire interface in preferred embodiments, between the zone of copper 22 and the zone of steel 21. The "A" plate 11 has a machined surface 43 configured to receive the cavity insert 13, fitting closely with the second surface 36 of the cavity insert. The machined surface 43 includes portions within the zone of steel 21, and portions within the zone of copper 22, which are configured to provide thermal contact to the exposed copper on the second surface of the cavity insert. The "A" plate 11 has a channel 42 disposed entirely within the zone of steel 21, configured to receive a liquid coolant, and act as a heatsink for transfer of heat to and from the mold cavity through the cavity insert 13. Such a channel 42 can be configured to receive a liquid coolant, by providing threaded inserts for connection to external piping, and otherwise as known in the technology field.

The example components of FIG. 1 utilize coolant channels to transfer heat heating and cooling cycles. In other embodiments, different types of heat transfer technologies can be applied. For example, the core or cavity inserts can be designed to mate with heat pipes that can move heat away from the mold cavity. Likewise, the "A" plate and the "B" plate could be coupled to heat pipes, or other types of heat transfer technologies.

Coalesced metal components having zones of steel and zones of copper can be configured to provide a steel skin of controlled thickness, hardness and yield strength surrounding a copper material. The thickness of the steel skin can be controlled to allow for differential shrinkage. The zone of copper beneath the steel skin will provide a low thermal impedance pathway for removing heat at the surface of the mold cavity through conduction, transferring the heat to a heat sink in the mold base, where radiant, convection or other cooling can expel the heat. For heating, the zone of copper beneath the steel skin will provide a conduction path enabling the surfaces of the mold cavity to come to temperature at a much faster pace.

Figure 2:
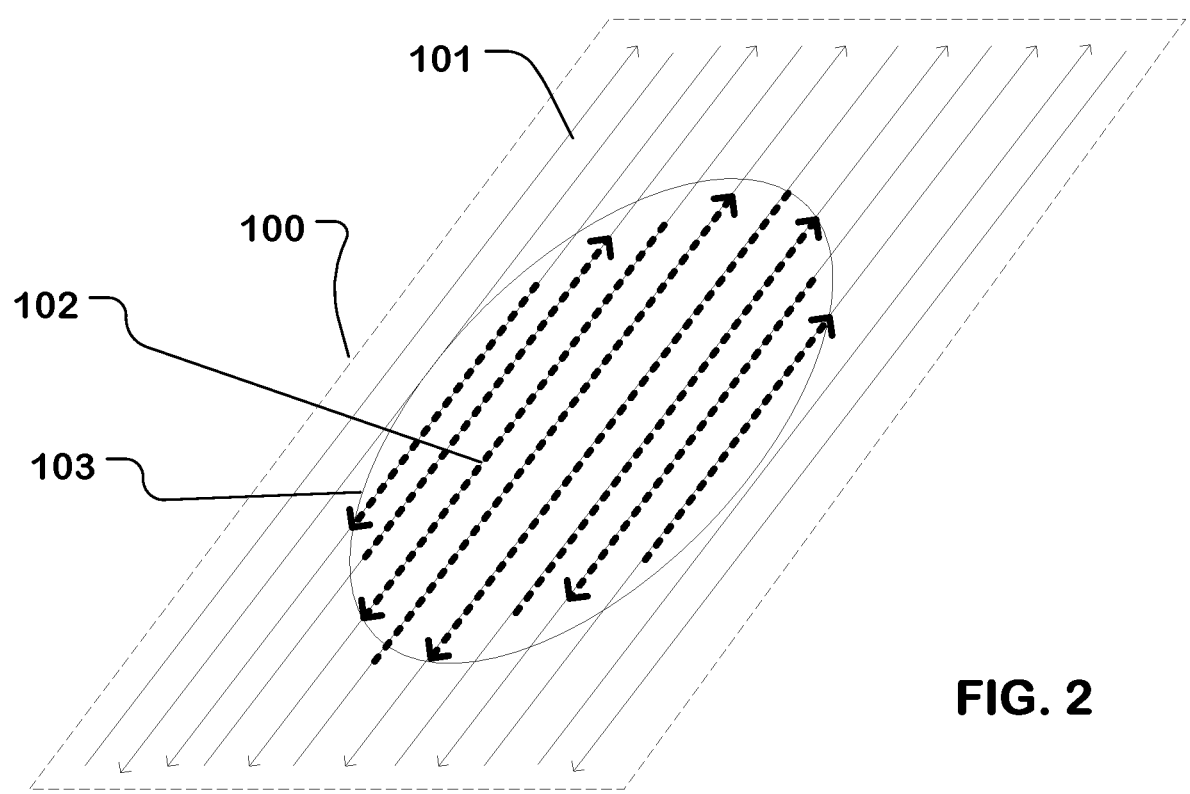
FIG. 2 and FIG. 3 are referred to for the purposes of description of laser deposition welding as deployed herein in the formation of coalesced metal bodies having complex 3D patterned zones of steel and copper.
Figure 3:
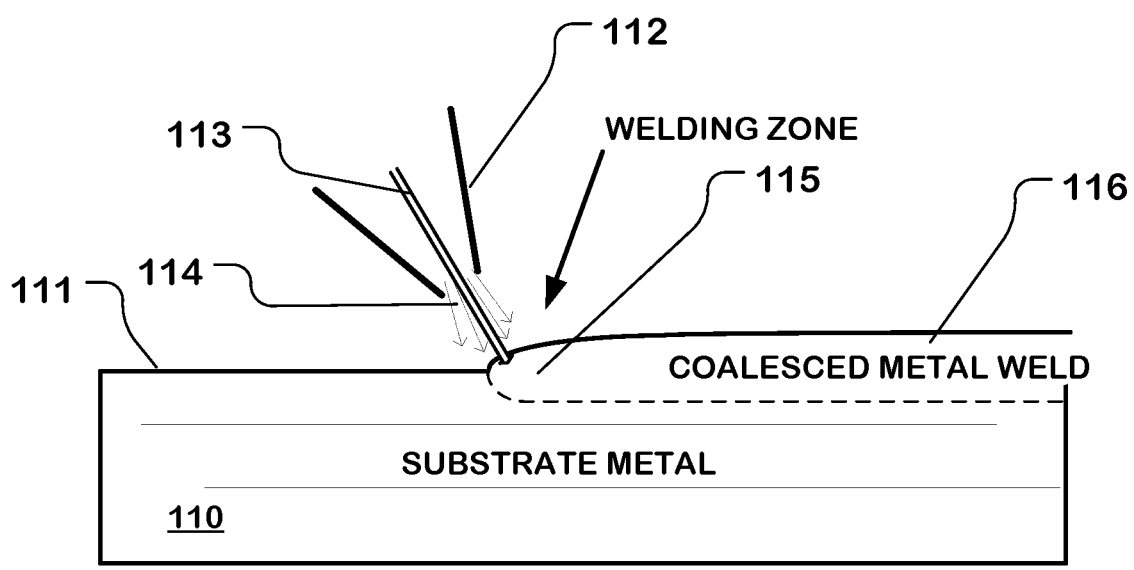

FIG. 2 and FIG. 3 are referred to for the purposes of describing a process for forming a coalesced metal body having zones of steel and zones of copper, with a transition zone in which the zones of steel and copper coalesce.

FIG. 2 illustrates a raster pattern which can be scanned in an additive manufacturing approach to forming layers of material having various compositions. Thus, a layer 100 is formed by scanning along the plurality of lines 101 using an additive manufacturing tool, such as laser deposition welding. A 2D shape 103 is defined in this example, by changing materials. The scan lines 101 outside of the shape 103 are formed using the material (or materials) of the zone of steel. Inside the shape 103, the scan lines 102 are formed using the material (or materials) of the zone of copper. By forming a plurality of such layers in succession, while controlling the 2D shape 103 of each layer, complex 3D patterns can be created in the zone of steel and in the zone of copper.

FIG. 3 is referred to for the purposes of describing how the transition region between the zone of steel and zone of copper coalesce, uniting together into one coalesced metal body. In laser deposition welding, the substrate 110 can comprise a plurality of layers formed using the patterning technique of FIG. 2. A current layer is formed on a surface 111 of the underlying substrate using a nozzle 112 which directs the laser beam 113 into a welding zone 115, along with a powder 114 of the material being added to the structure. As the nozzle moves along the surface 111, the coalesced metal weld 116 is formed on the surface. In the welding zone 115, the material of the underlying layer, the powder, and the existing coalesced metal weld 116 unite or consolidate by heating to a plastic or fluid state and flowing together. Upon cooling, the layers coalesce into a single metal body, joining up with a high strength connection and a low thermal impedance connection.

Figure 4:
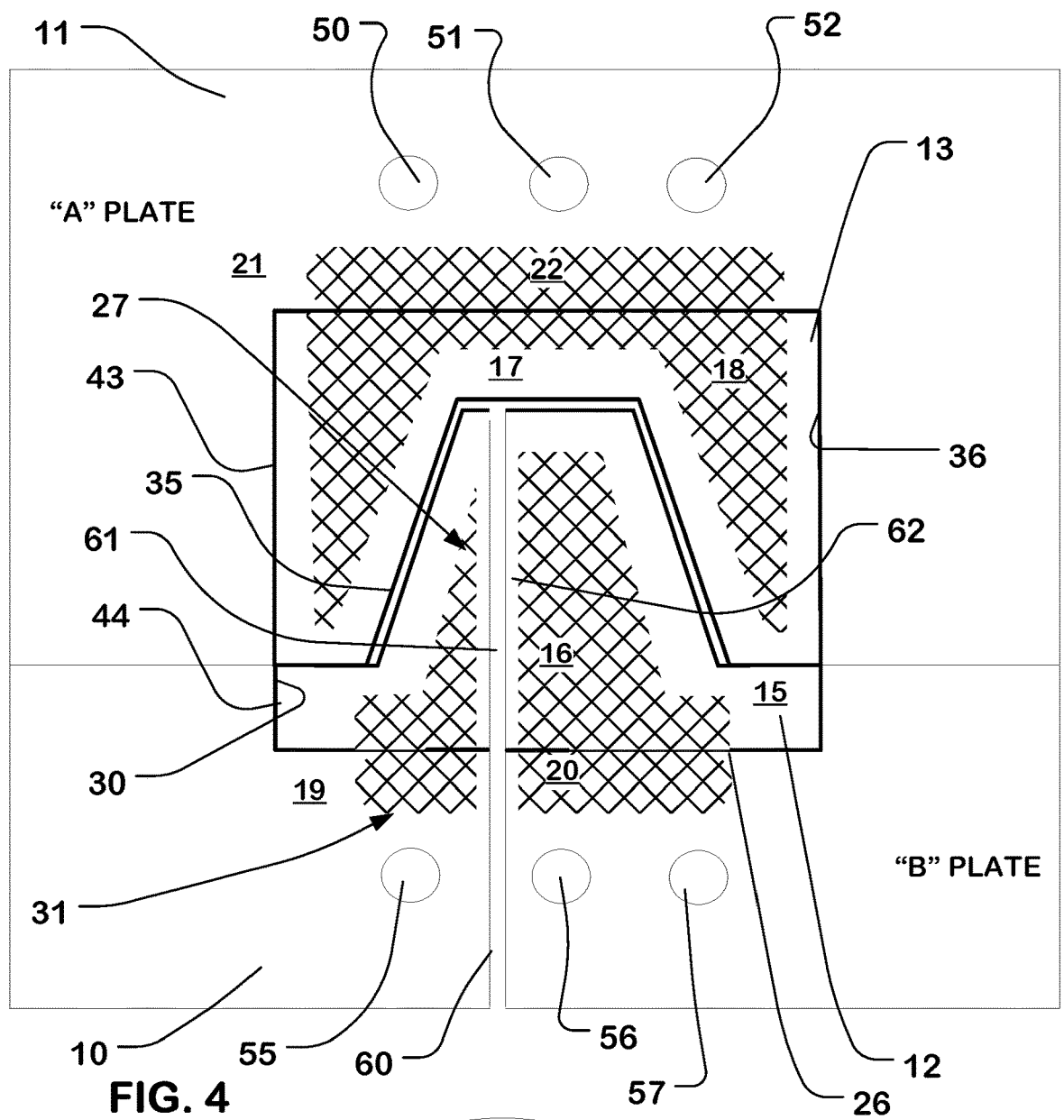
FIG. 4 is a simplified cross-section of a set of machine components for an injection molding machine, including channels formed through the coalesced metal bodies completely within the zone of steel.

FIG. 4 is a simplified diagram of the four components of an injection molding machine discussed with reference to FIG. 1, in which the same reference numerals are used to refer to similar elements of the figure.

FIG. 4 is modified relative to FIG. 1 by showing a plurality of cooling channels 50, 51, 52 bored through the "A" plate 11, arranged orthogonal to the page of the figure for accepting coolant fluid. The cooling channels 50, 51, 52 are disposed entirely within the zone of steel 21 of the "A" plate 11. In addition, a plurality of cooling channels 55, 56, 57 bored through the "B" plate 10 are illustrated. These cooling channels 55, 56, 57 are disposed entirely within the zone of steel 19 of the "B" plate 10.

Also, the embodiment shown in FIG. 4 is modified relative to FIG. 1 by including an ejector pin guide channel 60 which extends through the "B" plate, and an ejector pin guide channel 61 which extends through the core insert 12. An ejector pin is inserted through the channel 60, 61 and used to eject a molded component from the mold cavity after cooling. The surface of the ejector pin guide channel 60 in the "B" plate 10 is disposed entirely within the zone of steel 19. As illustrated in FIG. 4, the zone of copper 20 in the "B" plate surrounds a sub-zone of the zone of steel through which the ejector pin guide channel 60 is bored. The thickness of the sub-zone of the zone of steel between the transition zone and the surface of the channel is chosen to provide hardness and yield strength to the component, capable of thousands or millions of cycles.

Likewise, the surface of the ejector pin guide channel 61 in the core insert 12 is disposed entirely within the zone of steel 15. The zone of copper 16 surrounds a sub-zone 62 of the zone of steel through which the ejector pin guide channel 61 is bored. The thickness of the sub-zone of the zone of steel between the transition zone and the surface of the channel is chosen to provide hardness and yield strength to the component, capable of thousands or millions of cycles.

Figure 5:
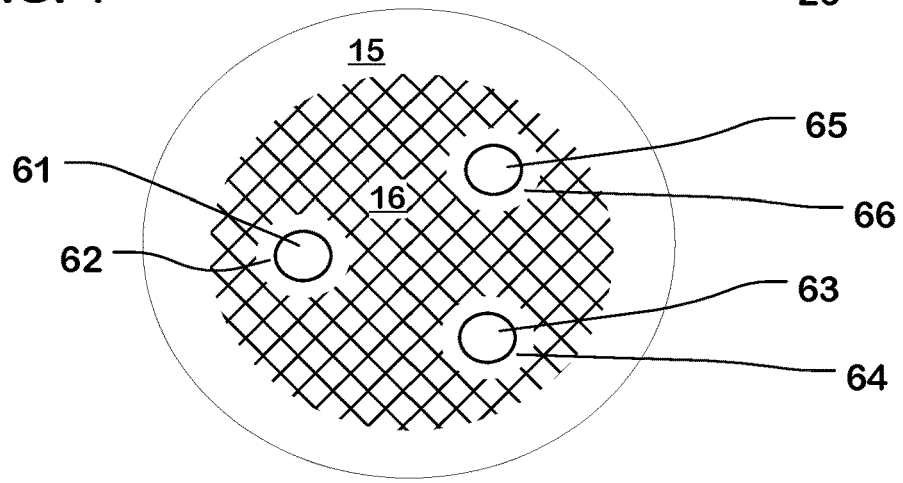
FIG. 5 is a simplified cross-section taken orthogonal to that of FIG. 4 through a core insert, showing a zone of steel, a zone of copper, and ejector pin guide channels completely within sub-zones of the zone of steel.

FIG. 5 shows a cross-section taken through the core insert 12 showing a 2D pattern of the zone of steel 15 and the zone of copper 16 in one layer of the 3D patterned zones of the component. In this cross-section, the ejector pin guide channel 61 is illustrated, which is formed entirely within the sub-zone 62 of the zone of steel. The sub-zone 62 of the zone of steel is surrounded completely by the zone of copper 16 in this layer, although in some embodiments sub-zone 62 will be continuous with a main body of the zone of steel 15 at the boundaries of the zone of copper 16. FIG. 5 also shows additional ejector pin guide channels 63, 65, each of which is formed entirely within a sub-zone 64, 66 of the zone of steel 15.

Figure 6:
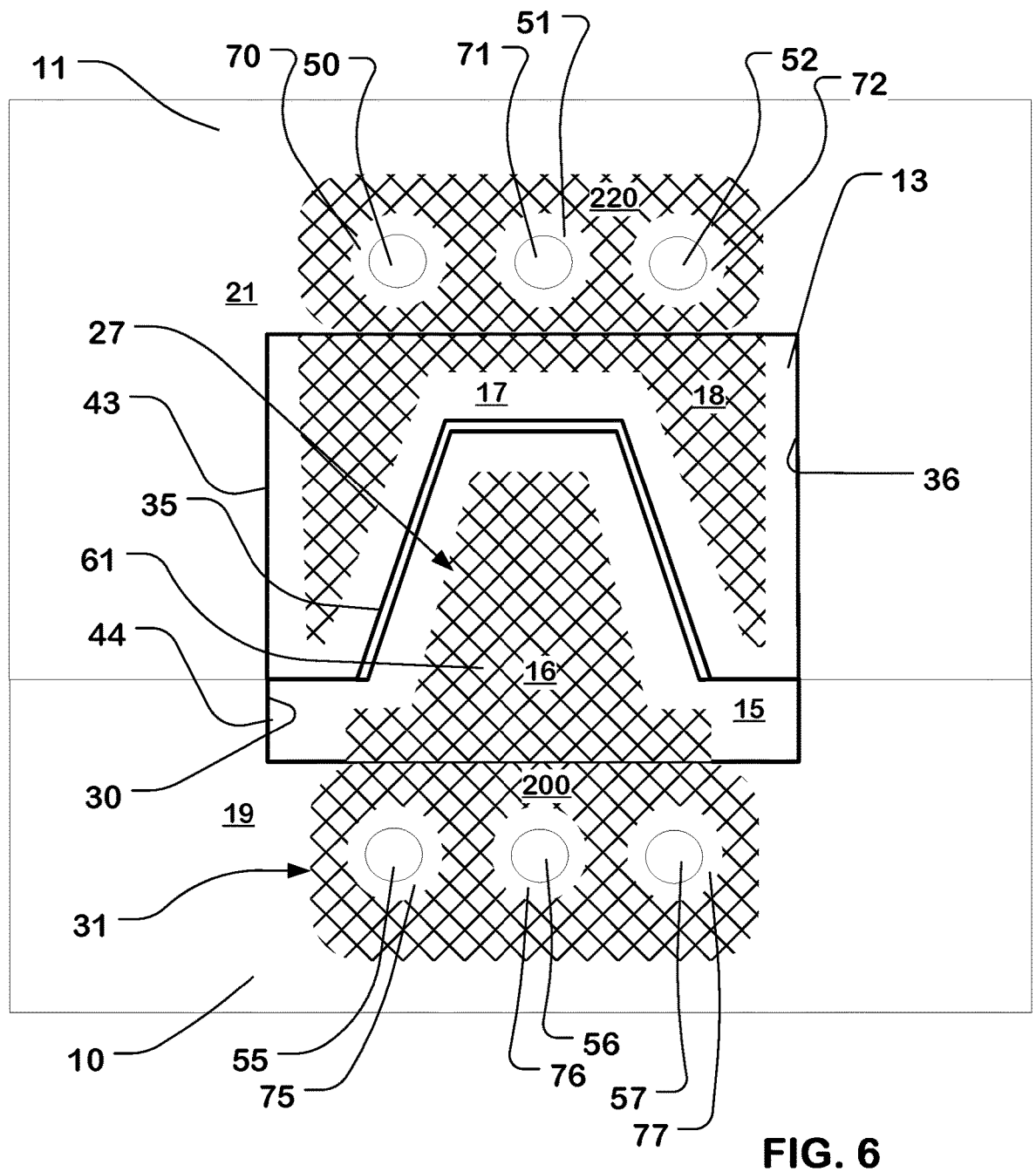
FIG. 6 is a simplified cross-section of an alternative embodiment of a set of machine components for injection molding machine as described herein.

FIG. 6 is a simplified diagram of the four components of an injection molding machine discussed with reference to FIG. 1, in which the same reference numerals are used to refer to similar elements of the figure.

FIG. 6 is modified relative to FIG. 1 by showing, like FIG. 4, a plurality of cooling channels 50, 51, 52 bored through the "A" plate 11, arranged orthogonal to the figure for accepting coolant fluid. The cooling channels 50, 51, 52 are disposed entirely corresponding to sub-zones 70, 71, 72 of the zone of steel 21 of the "A" plate 11.

In addition, a plurality of cooling channels 55, 56, 57 bored through the "B" plate 10 are illustrated. These cooling channels 55, 56, 57 are disposed entirely within corresponding sub-zones 75, 76, 77 of the zone of steel 19 of the "B" plate 10.

In the example of FIG. 6, the zone of copper 220 in the "A" plate 11 is expanded relative to FIG. 1, and surrounds at least parts of the sub-zones 70, 71, 72 in the zone of steel that surrounds the cooling channels 50, 51, 52. Likewise, the zone of copper 200 in the "B" plate 10 is expanded relative to FIG. 1, and surrounds at least parts of the sub-zones 75, 76, 77 in the zone of steel that surround cooling channels 55, 56, 57. In alternative embodiments, the cooling channels can be disposed entirely within the zone of copper, or sub-zones of the zone of copper, that can be surrounded by the zone of steel.

With reference to FIGS. 1, 4 and 6, it can be seen that the zone of steel and the zone of copper in a coalesced metal body as described herein can comprise respective complex 3D patterns. These patterns can be implemented as required for the thermal environment and the stress environment of a particular component. The zone of steel can be patterned so that surfaces that require high hardness and high yield strength are disposed in this zone of steel. Also, the zone of steel can be patterned so that stress concentrators or risers in the component are disposed within the zone of steel. The zone of copper can be patterned so as to fill the coalesced body around the zones of steel used for structural purposes, to reduce the overall thermal impedance of the component.

Also, the technology can be deployed to make complementary components of a machine, such as an injection molding machine. Thus, the "B" plate and the core insert can be manufactured as coalesced metal components having zones of copper that mate in the recess of the "B" plate designed to receive the core insert. Likewise, the "A" plate and the cavity insert can be manufactured as coalesced metal components having zones of copper that mate in the recess of the "A" plate designed to receive the cavity insert.

The zones of copper and steel can also be configured to receive cooling channels, guide pins, sprue bushing channels, cavity gates, runner cavity surfaces, and the other features of the components in an injection molding machine. Furthermore, the technology is extendable to a variety of types of machines utilizing components of this nature.

As a result, complex components of machines that require high yield strength, and low thermal impedance, can be provided using this technology.

Figure 7:
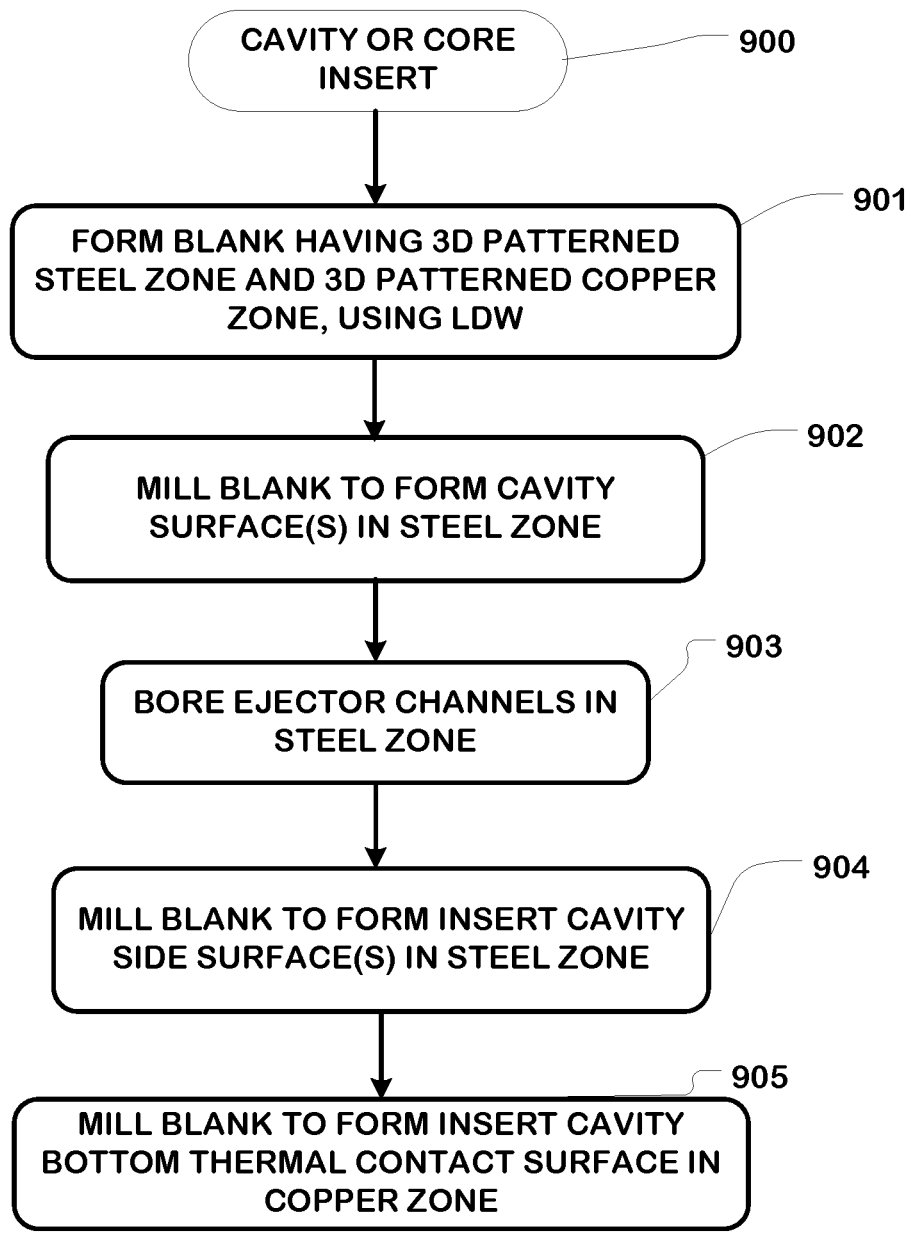
FIG. 7 is a simplified flowchart for a method for manufacturing a core insert or a cavity insert having 3D patterned zones of steel and copper, with a transition region in which the zones of steel and copper coalesce.
Figure 8:
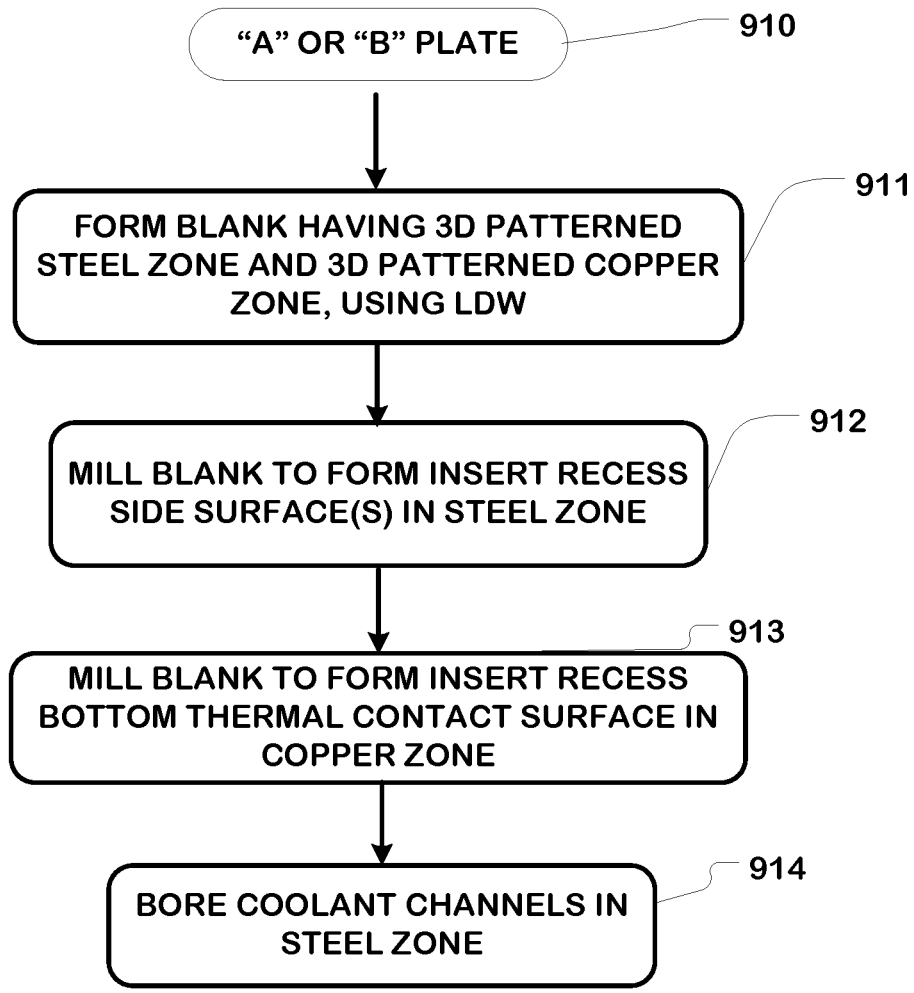
FIG. 8 is a simplified flowchart for a method for manufacturing an "A" plate or a "B" plate having 3D patterned zones of steel and copper, with a transition region in which the zones of steel and copper coalesce.

FIG. 7 and FIG. 8 are simplified diagrams of methods for manufacturing components, such as the components shown in FIG. 1, FIG. 4, and FIG. 6.

In FIG. 7, the method for forming a cavity or core insert is illustrated. First, a core or cavity insert pattern is determined (900). Using laser deposition welding, or an equivalent technology, a blank is formed having a 3D patterned steel zone and a 3D patterned copper zone (901). As described above, the patterned steel zone and the patterned copper zone coalesce in a transition region to form a coalesced metal body. After forming the coalesced metal body, the blank is milled (or machined) to form the cavity surface or surfaces in the steel zone (902). Next according to this process, ejector pin guide channels are bored in the steel zone (903). Also, the blank is milled to form insert cavity side surfaces in the steel zone (904). Also, the blank is milled to form a bottom thermal contact surface in the copper zone for thermal contact with a surface in a recess of a support plate that receives the insert in this example (905).

FIG. 8 is a simplified diagram of a method for manufacturing an "A" or "B" plate. First, the "A" or "B" plate pattern is determined (910). Using laser deposition welding, or an equivalent technology, a blank is formed having a 3D patterned steel zone and a 3D patterned copper zone (911). The coalesced metal blank is milled to form insert recess side surfaces in the steel zone (912). Also, the coalesced blank is milled to form insert recess bottom thermal contact surfaces in the copper zone (913). The coalesced metal blank is further machined by boring cooling channels in the steel zone (914).

FIGS. 7 and 8 are flow charts illustrating manufacturing steps for coalesced metal components as described herein. It will be appreciated that many of the steps can be combined, performed in parallel, or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after, and between those shown.

The use of components described herein which fuse copper material and durable and hard steel can enable decreases in the overall cycle times for injection molding of any plastic part. This can reduce the cost of the plastic part proportionally. Also, the technology can enable manufacturing of a higher quality, much more accurate part, using a more reliable and repeatable process. As a result, the number of part scrapped in the processing lines can be reduced as well. Similar advantages can be achieved applying the technology herein to other types of machines.

While the present technology is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the technology and the scope of the following claims.

The invention claimed is:

1. A machine component, comprising:
   a coalesced metal body having a zone of steel and a zone of copper, with a transition zone in which the zones of steel and copper coalesce, wherein the transition zone is a welded combination of steel and copper;
   a machined surface on the zone of steel on a first side of the coalesced metal body; and
   the zone of copper having a proximal boundary being disposed proximal to, and separated by, the zone of steel from the machined surface, and a distal boundary distal to the machined surface and proximal to a second surface of the coalesced metal body.

2. The component of claim 1, including a channel completely in the zone of steel extending through the coalesced metal body.

3. The component of claim 2, wherein the channel is configured for receiving a flow of liquid coolant.

4. The component of claim 2, wherein the channel is configured for receiving a movable pin.

5. The component of claim 2, wherein the channel is configured for receiving a guide pin.

6. The component of claim 1, including a channel completely in the zone of steel extending through the coalesced metal body, and wherein the zone of copper surrounds sub-zones of the zone of steel including the channel.

7. The component of claim 1, wherein the zone of copper is at least 99% copper by weight.

8. The component of claim 1, wherein the machined surface has a hardness of at least R 45.

9. The component of claim 1, wherein the zone of copper is exposed at the second surface of the coalesced metal body.

10. The component of claim 1, wherein the machined surface on the zone of steel includes a surface of the mold cavity on a first side of the coalesced metal body.

11. The component of claim 10, including an ejector pin guide channel completely in the zone of steel extending through the coalesced metal body.

12. The component of claim 1, wherein the machined surface is configured to receive a core insert or a cavity insert for an injection molding machine.

13. An injection molding machine having a mold cavity, comprising:
   a coalesced insert body comprising an insert zone of steel and an insert zone of copper, with a transition zone in which the insert zones of steel and copper coalesce, and having a first machined surface on the insert zone of steel providing a surface of the mold cavity, a second machined surface providing a contact surface for a plate receiving the insert body, the copper zone having a proximal boundary being disposed proximal to, and separated by, the zone of steel from the surface of the mold cavity, and a distal boundary distal to the surface of the cavity, the distal boundary including a portion exposed in the contact surface, wherein the transition zone in the coalesced insert body is a welded combination of steel and copper; and
   a coalesced plate body comprising a plate zone of steel and a plate zone of copper, with a transition zone in which the plate zones of steel and copper coalesce, and having a machined surface configured to receive the coalesced insert body for the injection molding machine, the plate zone of steel including a boundary region exposed in the machined surface, and the plate zone of copper having a proximal boundary exposed in the machined surface and a distal boundary distal to the machined surface, wherein the transition zone in the coalesced plate body is a welded combination of steel and copper.

14. The injection molding machine of claim 13, including an ejector pin channel completely in the insert zone of steel extending through the coalesced insert body.

15. The injection molding machine of claim 13, including:
   an ejector pin channel completely in the insert zone of steel extending through the coalesced insert body; and
   a corresponding ejector pin channel completely in the plate zone of steel extending through the coalesced plate body.

16. The injection molding machine of claim 13, including a coolant channel completely in the plate zone of steel extending through the coalesced plate body configured for receiving a flow of liquid coolant.

17. A method for manufacturing the machine component of claim 1, comprising: using laser deposition welding, forming a coalesced metal body having a 3D patterned zone of steel and a 3D patterned zone of copper, with a transition zone of a welded combination of steel and copper in which the zones of steel and copper coalesce; milling a surface on the zone of steel on a first side of the coalesced metal body; and the zone of copper having a proximal boundary being formed proximal to, and separated by, the zone of steel from the milled surface, and a distal boundary distal to the milled surface and proximal to a second surface of the coalesced metal body.

18. The method of claim 17, including boring a channel completely in the zone of steel extending through the coalesced metal body, and configuring the channel for receiving a flow of liquid coolant.

19. The method of claim 17, including boring a channel completely in the zone of steel extending through the coalesced metal body, and configuring the channel for receiving a movable pin.

* * * * *